United States Patent [19]

Nagai et al.

[11] 3,856,842

[45] Dec. 24, 1974

[54] PROCESS FOR PRODUCING SILYLTHIOETHERS

[75] Inventors: Yoichiro Nagai; Iwao Ojima, both of Sagamihara, Japan

[73] Assignee: Sagami Chemical Research Center, Japan

[22] Filed: Aug. 23, 1973

[21] Appl. No.: 391,039

[30] Foreign Application Priority Data
Nov. 27, 1972   Japan.............................. 47-117953

[52] U.S. Cl....... 260/448.2 E, 260/448.2 N, 252/431
[51] Int. Cl. ............................................. C07f 7/08
[58] Field of Search ............. 260/448.2 E, 448.2 N; 252/431

[56] References Cited
UNITED STATES PATENTS

| | | | |
|---|---|---|---|
| 3,565,935 | 2/1971 | Berger | 260/448.2 E |
| 3,565,937 | 2/1971 | Berger | 260/448.2 E X |
| 3,590,065 | 6/1971 | Rakus et al. | 260/448.2 E X |

*Primary Examiner*—Daniel E. Wyman
*Assistant Examiner*—Paul F. Shaver
*Attorney, Agent, or Firm*—Oblon, Fisher, Spivak, McClelland & Maier

[57] ABSTRACT

Silylthioethers are produced by reacting an organosilicon hydride with a mercaptan in the presence of tris(-triphenylphosphine) chlororhodium.

6 Claims, No Drawings

PROCESS FOR PRODUCING SILYLTHIOETHERS

BACKGROUND OF THE INVENTION

1. Field of the Invention

This invention relates to a process for producing a silylthioether and more particularly, it relates to a process for producing a silylthioether be dehydrogenatively condensing an organosilicon hydride with a mercaptan.

2. Description of the Prior Art

Silylthioethers have been prepared by the following processes:

1. A process for producing silylthioethers by reacting a compound having Si-N bond with a mercaptan is shown by E. Larsson and R.E.I. Mariu, Swed. No. 138,357 Dec. 9, 1952.
2. A process for producing silylthioethers by reacting a chlorosilane with a mercaptide shown by E.W. Abel, J. Chem. Soc., 1960, 4406.
3. A process for producing silylthioethers by reacting a triphenylsilyl lithium with sulfur to result in triphenylsilylthiolithium and then reacting alkyl or acyl halide with it as shown by H. Gilman and G.D. Lichtenwater, J. Org. Chem., 25, 1064 (1960).
4. A process for producing silylthioethers by reacting sodium sulfide with trimethylchlorosilane to result in hexamethyldisilylthiane and then reacting an alkylmercaptan with it as shown by E.A. Abel, J. Chem. Soc., 1961, 4933.

However, these processes suffer disadvantages. For example, in the process of (1), a silylamine which is prepared from a silane and an amine must be employed thereby necessitating additional steps in comparison with a process for directly reacting a silane with a sulfur compound.

Process (2) can be an industrial process, however, chlorosilanes are quite sensitive to moisture and therefore require special precautions in handling, more complicated reaction operations and the like.

Process (3) can not be applied as an industrial process because only certain limited silyl lithium compounds can be prepared and the yield of these silyl lithium compounds is quite low.

Process (4) has the same disadvantages as process (1) because disilylthiane must be prepared in the first step, and the undesirable by-product $H_2S$ is generated in the reaction of the disilylthiane with mercaptan.

SUMMARY OF THE INVENTION

Accordingly, one object of the invention is to provide a process for easily producing a silylthioether in high yield.

Another object of the invention is to provide a process for producing a silylthioether under a mold and neutral condition without any by-product except hydrogen so that the product can be easily separated in a stable form.

Briefly, these objects and other objects of the invention as will hereinafter become apparent are achieved by providing a process for producing a silylthioether by reacting an organosilicon hydride with a mercaptan in the presence of a tris(triarylphosphine)halorhodium such as tris(triphenylphosphine)chlororhodium.

DESCRIPTION OF THE PREFERRED EMBODIMENTS

The mercaptans used in the process of the invention can be alkyl mercaptans, particularly lower $C_1$–$C_6$ alkyl, e.g., methyl mercaptan, ethyl mercaptan; aralkyl mercaptans, e.g., benzyl mercaptan; aryl mercaptans, e.g., thiophenol p-tolyl mercaptan; and the like.

The organosilicon hydride used in the invention can be monohydrosilanes e.g., triethylsilane, phenyldimethylsilane, triphenylsilane; dihydrosilanes e.g., diethylsilane, phenylmethylsilane, diphenylsilane; trihydrosilanes e.g., phenylsilane, cyclohexylsilane; and the like.

The catalyst used in the process of the invention is a tris(triarylphosphine) halorhodium such as tris(triphenylphosphine)chlororhodium which has been known as Wilkinson catalyst used for hydrogenation, decarbonylation, oxidation and carbonylation.

The dehydrogenation condensation can be easily initiated by adding from about 0.01 – 0.1 mole percent tris(triphenylphosphine)chlororhodium to an equimolar mixture of an organosilicon hydride and a mercaptan at 20°– 70°C with stirring. After the generation of hydrogen is finished, the stirring is continued for a while to complete the reaction. A solvent, e.g., benzene, n-hexane, tetrahydrofuran, ether, and the like may be used when the mercaptan or organosilicon hydride is solid.

The silylthioethers prepared by the process of this invention can be widely used as starting materials for various polymers and plasticizers similar to alkoxysilanes and silylamines. The silylthioethers can be also used as silylation agents for a compound having active hydrogen atom instead of silylamines silylation agents.

In another aspect of the invention, dihydrosilane and trihydrosilane can be used as a cross-linking agent for polymers having a mercapto residual group in the presence of a tris(triarylphosphine)halorhodium compound. The following is a typical cross-linking reaction formula of the invention.

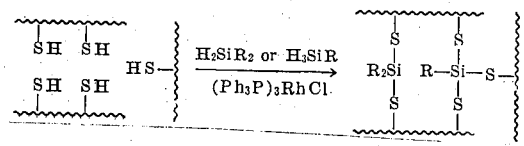

Having generally described the invention, a more complete understanding can be obtained by reference to certain specific examples, which are included for purposes of illustration only and are not intended to be limiting unless otherwise specified.

EXAMPLE 1

A mixture of 11.6 g (0.1 mol.) of triethylsilane and 11.0 g (0.1 mol.) of thiophenol was admixed with 500 mg (0.5 mol. percent) of tris(triphenylphosphine)chlororhodium and the mixture was heated at 50°C in a nitrogen atmosphere and the generation of hydrogen was observed. After stirring it for 15 minutes, the reaction mixture was cooled and 100 ml of n-hexane was added to precipitate the catalyst. After filtering the catalyst, the filtrate was concentrated and distilled under reduced pressure to obtain 22.2 g of triethylphenylthiosilane having a boiling point of 77°C/0.25 mmHg with a yield of 98 percent.

EXAMPLE 2

A mixture of 11.6 g (0.1 mol.) of triethylsilane and 6.2 g (0.1 mol.) of ethylmercaptan was admixed with 500 mg (0.5 mol. percent) of tris(triphenylphosphine) chlororhodium and the mixture was heated at 35°C in a nitrogen atmosphere and the generation of hydrogen was observed. After stirring it for 2 hours, the reaction mixture was treated in accordance with Example 1 and distilled under reduced pressure to obtain 14.2 g of triethylethylthiosilane having a boiling point of 99°C/24 mm Hg with a yield of 80 percent.

According to a gas chromatography analysis of the reaction mixture at the time of reaction completion, a small amount of silane and mercaptan remained, however, the reaction is substantially stoichiometrical.

EXAMPLE 3

A mixture of 18.4 g (0.1 mol.) of diphenylsilane and 6.2 g of ethyl mercaptan was admixed with 50 mg (0.05 mol. percent) of tris(triphenylphosphine) chlororhodium, and the mixture was stirred in a nitrogen atmosphere for 30 minutes to complete the reaction. The reaction mixture was directly distilled under reduced pressure to obtain 23.4 g of diphenylethylthiosilane having a boiling point of 130°C/0.65 mmHg with a yield of 95 percent.

EXAMPLES 4 – 12

Under the following reaction conditions, using various mercaptans and organosilicon hydrides, the following results were obtained following the procedure of Example 1.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for producing a silylthioether which comprises reacting an organosilicon hydride selected from the group consisting of trialkyl monohydrosilanes, triaryl monohydrosilanes, aryldialkyl monohydrosilanes, diarylalkyl monohydrosilanes, diarylalkyl monohydrosilanes, diaryl dihydrosilanes, arlyalkyl dihydrosilanes, dialkyl dihydrosilanes, aryl trihydrosilanes, and alkyl trihydrosilanes with a merpactan selected from the group consisting of alkyl mercaptans, aralkyl mercaptans and aryl mercaptans in the presence of tris (triphenylphosphine) halorohodium.

2. The process according to claim 1, wherein the organosilicon hydride is selected from the group consisting of triethylsilane, tripropylsilane, phenyldimethylsilane, triphenylsilane, diethylsilane, phenylmethylsilane, diphenylsilane, phenylsilane, and cyclohexylsilane.

3. The process according to claim 1, wherein the mercaptan is selected from the group consisting of $C_1^+{}_6$ lower alkyl, mercaptans, benzyl mercaptans, thiophenol and p-tolyl mercaptan.

4. The process according to claim 1, wherein the organosilicon hydride is triethylsiliane and the mercaptan is thiophenol.

5. The process according to claim 1, wherein the reaction takes place in a solvent.

6. The process according to claim 1, wherein the tris(triphenylphosphine) is present in an amount of from 0.01 – 0.1 mole percent.

TABLE

| Example | Organosilicon hydrige (equ.) | Mercaptan (equ.) | Reaction Condition | Catalyst (mol %) | Product | Boiling point (°C/mmHg) | Yield (%) |
|---|---|---|---|---|---|---|---|
| 4 | n—Pr$_3$SiH | PhSH | 70°C, 60 min. | 0.5 | n—Pr$_3$SiSPh | 92/0.4 | 98 |
| 5 | PhMe$_2$SiH | PhSH | 50°C, 5 min. | 0.5 | PhMe$_2$SiSPh | 113/0.6 | 97 |
| 6 | Et$_3$SiH | PhCH$_2$SH | 70°C, 30 min. | 0.5 | Et$_3$SiSCH$_2$Ph | 168/21 | 98 |
| 7 | Et$_3$SiH | t-BuSH | 70°C, 10 min. | 0.5 | Et$_3$SiSBu—t | 108/21 | 90 |
| 8 | Et$_2$SiH$_2$ | PhSH | 15°C, 30 min. | 0.1 | Et$_2$(H)SiSPh | 131/23 | 94 |
| 9 | PhMeSiH$_2$ | PhSH | room temperature 30 min. | 0.1 | PhMe(H)SiSPH | 162/17 | 95 |
| 10 | Ph$_2$SiH$_2$ | PhSH | room temperature 15 min. | 0.1 | Ph$_2$(H)SiSPh | 151/02 | 98 |
| 11 | Et$_3$SiH | p—CH$_3$C$_6$H$_4$SH | 50°C, 15 min. | 0.5 | Et$_{3H}$SiSC$_6$H$_4$CH$_3$-p | 81/0.25 | 98 |
| 12 | Et$_2$SiH$_2$ | p—CH$_3$C$_6$H$_4$SH | 15°C, 30 min. | 0.1 | Et$_{2H}$SiSC$_6$H$_4$CH$_3$-p | 129/18 | 95 |

* * * * *